Figure 1:
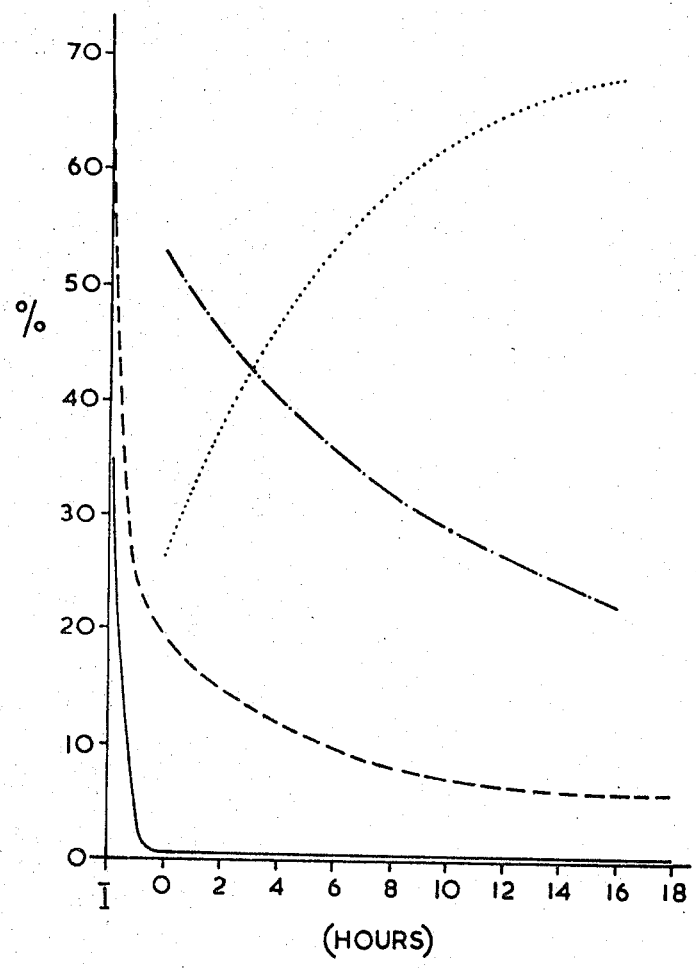

United States Patent [19]

Horner

[11] 3,855,312

[45] Dec. 17, 1974

[54] PRODUCTION OF DI-4-CHLOROPHENYL SULPHONE

[75] Inventor: Patrick James Horner, Welwyn Garden City, England

[73] Assignee: Imperial Chemical Industries Limited, London, England

[22] Filed: Oct. 25, 1972

[21] Appl. No.: 300,871

Related U.S. Application Data

[63] Continuation-in-part of Ser. No. 112,892, Feb. 5, 1971, abandoned.

[30] Foreign Application Priority Data

Feb. 6, 1970 Great Britain..................... 5793/70
Jan. 15, 1971 Great Britain..................... 2112/71
Oct. 16, 1972 Great Britain.................. 47547/72

[52] U.S. Cl.......................... 260/607 A, 260/505 E
[51] Int. Cl........................................... C07c 147/08
[58] Field of Search.............................. 260/607 A

[56] References Cited
UNITED STATES PATENTS

2,833,826  5/1958  Jarboe ........................... 260/607 A

OTHER PUBLICATIONS

Chem. Abstracts, Vol. 17, 1958, 5.

Memories Presentes a la Societe Chimique, Fouqueet Lacroix, p. 180 & 183.

*Primary Examiner*—Lewis Gotts
*Assistant Examiner*—D. R. Phillips
*Attorney, Agent, or Firm*—Cushman, Darby & Cushman

[57] ABSTRACT

A process for the preparation of di-4-chlorophenyl sulphone in which (1) a reaction mixture containing 4-chloro-benzenesulphonic acid and chlorobenzene is kept at a temperature lying between 220°C and 260°C at a superatmospheric pressure lying between 30 and 1100 $kN/m^2$, (2) water is removed as vapour continuously as it is formed, and (3) the water vapour and accompanying chlorobenzene vapour are condensed and separated and the chlorobenzene is returned to the reaction mixture.

15 Claims, 7 Drawing Figures

PRODUCTION OF DI-4-CHLOROPHENYL SULPHONE

This is a continuation-in-part of my prior application Ser. No. 112,892 filed Feb. 5, 1971, now abandoned.

The invention relates to the production of di-4-chlorophenyl sulphone. Di-4-chlorophenyl sulphone is required in high purity and good yield as a starting material for production of aromatic polymers (as described for example in British specifications 1,078,234 and 1,153,035 and U.S. Pat. No. 3,432,468 by reaction with alkali metal hydroxides, hydrosulphides or sulphides or di-alkali metal salts of dihydric phenols or thiophenols and for the production of di-4-aminophenyl sulphone in the pharmaceutical industry.

According to the present invention a process is provided for the preparation of di-4-chlorophenyl sulphone in which (1) a reaction mixture containing 4-chlorobenzenesulphonic acid and chlorobenzene is kept at a temperature lying between 220°C and 260°C at a superatmospheric pressure lying between 4 and 160 p.s.i. (30 and 1100 kN/m²), (2) water is removed as vapour continuously as it is formed, and (3) the water vapour and accompanying chlorobenzene vapour are condensed and separated and the chlorobenzene is returned to the reaction mixture. The temperature preferably lies between 235°C and 255°C and most preferably between 242°C and 248°C. The water formed during the reaction is preferably removed as promptly as possible from the reaction mixture, for example by sparging with an inert gas such as nitrogen or by stirring and boiling the mixture vigorously. Preferably the reaction mixture is kept boiling at a temperature lying between 220°C and 260°C at a superatmospheric pressure lying between 30 and 1100 kN/m².

In a preferred embodiment of the present invention the 4-chlorobenzenesulphonic acid is formed in situ from additional quantities of chlorobenzene and a sulphonating agent, such as for example sulphur trioxide or chlorosulphonic acid but preferably concentrated sulphuric acid. In the preferred embodiment, reaction of chlorobenzene with sulphonating agent appears to be very rapid and reaction of so-formed 4-chlorobenzenesulphonic acid with further quantities of chlorobenzene appears to be comparatively slow. This is illustrated by the following Example 1 and accompanying FIG. 1.

EXAMPLE 1

Chlorobenzene (1.5 dm³) and concentrated sulphuric acid (specific gravity 1.84; 0.5 dm³) [volume ratio 3:1] were charged into a stainless steel reaction vessel of capacity 4 dm³ fitted with a stirrer and thermometer and a fractionating column (packed with stainless steel) connected to a Dean & Starke assembly just filled with chlorobenzene and including a reflux condenser. The mixture was heated to 245°C and pressurised to a superatmospheric pressure of 65 p.s.i. (440 kN/m²). Chlorobenzene and water distilled off the top of the fractionating column where the water was separated in the Dean & Starke assembly and the chlorobenzene returned to the flask through the fractionating column. The reaction was kept boiling at 245°C by progressively reducing the pressure as the reaction proceeded. No further chlorobenzene additional to that from the Dean & Starke assembly was fed to the reaction vessel.

After 16 hours' reaction, the mixture was poured into water (20 dm³); the precipitate was collected, washed with water (cold; 4 × 2 dm³) and recrystallised from 1,2-dichloroethane to give a white solid, melting point 148°–150°C.

Analytical results are presented in the table below and in accompanying FIG. 1 in which the "initial" analysis is that of the initial charge and the "on temperature" analysis is that after the reaction mixture had reached boiling temperature of 245°C at 440 kN/m².

In FIG. 1, the analytical results (ordinate) are expressed as percent weight/weight and the reaction time (abscissa) in hours. The sulphuric acid content is represented by the continuous line; the chlorobenzene content by the dashed line; the total sulphone content by the dotted line and the sulphonic acid content by the dot/dash line.

| Analysis of reaction mixture (% w/w) | Initial | On Temperature | Reaction Time (hours) | | | | | | | |
|---|---|---|---|---|---|---|---|---|---|---|
| | | | 2 | 4 | 6 | 8 | 10 | 12 | 14 | 16 |
| Total sulphones | — | 26.6 | 38.0 | 47.4 | 54.0 | 59.8 | 62.5 | 65.3 | 67.1 | 68.2 |
| Sulphonic acid | — | 53.0 | 45.3 | 40.4 | 35.4 | 32.0 | 28.9 | 27.1 | 25.7 | 22.2 |
| Chlorobenzene | 65.0 | 18.5 | 14.4 | 11.2 | 9.9 | 7.8 | 7.3 | 6.7 | 6.1 | 7.0 |
| Sulphuric acid | 35.0 | 0.44 | 0.32 | 0.2 | 0.13 | 0.05 | 0.06 | 0.02 | 0.03 | — |
| 4,4'-isomer in total sulphones | — | 87.2 | 85.6 | 85.1 | 86.1 | 85.3 | 83.7 | 83.2 | 82.8 | 83.3 |
| 2,4'-isomer in total sulphones | — | 7.1 | 7.3 | 6.9 | 6.0 | 6.2 | 6.6 | 6.7 | 6.8 | 6.5 |
| 3,4'-isomer in total sulphones | — | 5.7 | 7.1 | 8.0 | 7.9 | 8.5 | 9.7 | 10.1 | 10.4 | 10.3 |

The results show that the formation of chlorobenzene sulphonic acid from chlorobenzene and concentrated sulphuric acid, compared with the subsequent formation of sulphones, is very rapid indeed and not critically dependent on reaction conditions.

Optimisation of yield of the desired di-4-chlorophenyl sulphone (4,4'-isomer) is therefore dependent upon the conditions for the reaction between 4-chlorobenzenesulphonic acid and chlorobenzene.

We have found that the yield of total isomeric dichlorophenyl sulphones in general and in particular the proportion of the desired di-4-chlorophenyl sulphone, expressed as a molar equivalent percentage based on the quantity of reacted chlorobenzene, varies with the temperature of the reaction, the pressure at which the reaction is carried out, the reaction time, and the presence of excess chlorobenzene, which when sulphuric acid is used may be expressed as the ratio of chlorobenzene to sulphuric acid in the initial charge. Of these variables, we have found that temperature of reaction is the most important.

As the reaction proceeds, the concentration of chlorobenzene in the reaction mixture decreases and that of higher-boiling components increases, so that the reaction temperature must increase or pressure decrease if the mixture is to be kept boiling. In order to maintain boiling and keep the reaction temperature within the range of the present invention, the reaction conditions are varied, for example by adding chlorobenzene or an inert azeotrope former to the reaction mixture, conveniently at the rate at which water produced in the reaction is formed, or by lowering the pressure under which the reaction is carried out.

The reaction mixture is strongly acidic and hence requires the use of constructional materials that will not be corroded by strong acids. Whilst reaction vessels and plant fabricated from stainless steels, "Inconel" or "Monel" metal may be used for experimental reactors on a small scale without an intolerable amount of corrosion, glass or glass-enamelled reaction vessels and pipework are preferred for large-scale construction.

The products of the reaction may be separated and the di-4-chlorophenyl sulphone purified by any method known in the art, for example, selective solvent washing, fractional crystallisation, or centrifugation.

The following Examples 2 to 7 and accompanying FIGS. 2 to 7 illustrate embodiments of the invention in which the reaction mixture is kept boiling at the desired temperature and at essentially constant pressure by addition of further chlorobenzene (additional to that returned from the Dean & Starke assembly).

EXAMPLE 2

Chlorobenzene (1000 cm³) and concentrated sulphuric acid (1000 cm³) were put into a stainless steel reaction vessel fitted with a reservoir containing further chlorobenzene, a stirrer and a fractionating column connected to a Dean & Starke assembly, just filled with chlorobenzene and including a reflux condenser. The reaction proceeded with continuous boiling for 10 hours at 220°C and an excess pressure of 70 KN/m² (about 10 p.s.i.), the temperature being held constant by further addition of chlorobenzene. Chlorobenzene and water distilled off the top of the fractionating column where the water was separated in the Dean & Starke assembly, and the chlorobenzene returned to the flask through the fractionating column.

After 10 hours, it was found that a further quantity of 2008 cm³ of chlorobenzene had been added as well as 521 cm³ of chlorobenzene which was displaced into the reaction vessel by 550 cm³ of water which had accumulated in the Dean & Starke apparatus.

From the analysis of the reaction mixture, it was calculated that 28.78 moles of chlorobenzene had reacted and that 9.37 moles (equivalent to 18.74 moles of chlorobenzene) of di-chlorophenyl sulphones (65% yield) together with 8.54 moles of chlorobenzenesulphonic acid had been produced. Infra-red analysis of the sulphone product showed 4.7% of the 2,4'-isomer and 5.4% of the 3,4'-isomer and hence 89.9% of the desired 4,4'-isomer.

EXAMPLE 3

Chlorobenzene (200 cm³) and concentrated sulphuric acid (150 cm³) were reacted in an apparatus similar to that of Example 2 except that a one-litre glass reaction vessel was used. The reaction proceeded for 10 hours at 230°C and 70 kN/m² (about 10 p.s.i.) excess pressure under continuous boiling, the temperature being held constant by further addition of chlorobenzene. After 10 hours, it was found that a further quantity of 1000 cm³ of chlorobenzene had been added as well as 80 cm³ displaced from the Dean & Starke apparatus by 84 cm³ water.

From analysis of the reaction mixture, it was calculated that 5.48 moles chlorobenzene had reacted and that 1.97 moles (equivalent to 3.94 moles of chlorobenzene) of di-chlorophenyl sulphones (72% yield) had been produced together with 1.06 moles of chlorobenzenesulphonic acid.

Infra-red analysis of the sulphone product showed 4% of the 2,4'-isomer and 12% of the 3,4'-isomer, and ultra-violet analysis showed a total of 15% of the 2,4'- and 3,4'-isomers. The product therefore contained 85-86% of the desired 4,4'-isomer.

EXAMPLE 4

The results of a number of experiments carried out in the manner of Example 2 in glass apparatus at an excess pressure of 70 kN/m² (about 10 p.s.i.) at various temperatures and a reaction time of 10 hours are tabulated below.

| Temperature (°C) | No. of Expts. | % Yield of di-chlorophenylsulphones | | |
|---|---|---|---|---|
| | | Total | 4,4'- | 2,4'- | 3,4'- |
| 180 | 1 | 32.6 | 32.0 | 0.3 | 0.3 |
| 200 | 4 | 59.9 | 54.4 | 3.0 | 2.5 |
| 210 | 3 | 69.4 | 60.0 | 5.0 | 4.4 |
| 220 | 23 | 73.4 | 63.9 | 3.7 | 5.8 |
| 230 | 5 | 79.6 | 63.6 | 2.5 | 13.5 |
| 240 | 6 | 77.5 | 65.3 | 4.7 | 7.5 |
| 220* | 5 | 65.1 | 45.7 | 19.4 | |

*atmospheric pressure

The results below 220°C or at atmospheric pressure are given for comparison.

Figure 2:
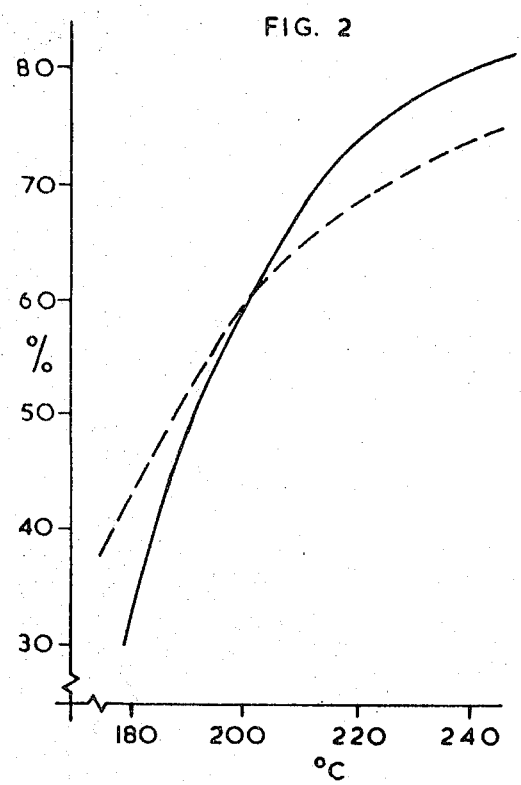
Figure 4:
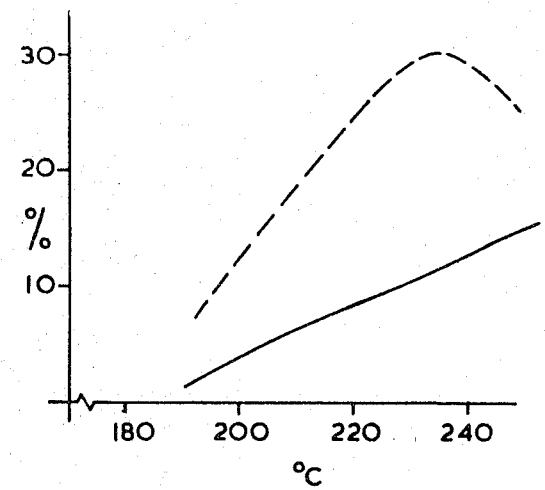
Figure 3:
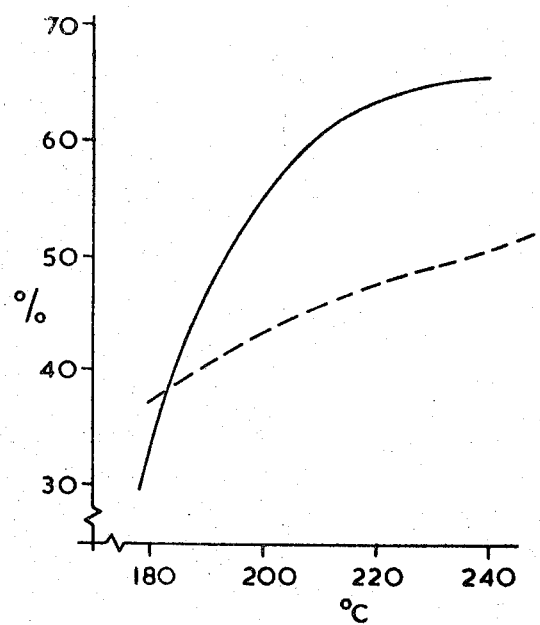
Figure 5:
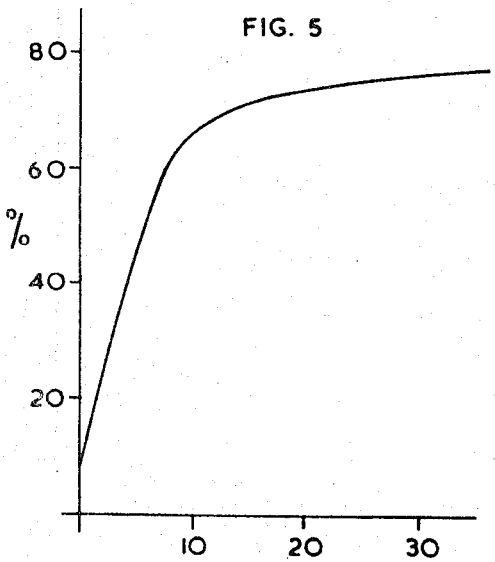

The variations of yield (ordinate) with temperature (abscissa) in such experiments are shown in FIGS. 2 to 4 in which the total yield is presented as the continuous line in FIG. 2; the yield of di-4-chlorophenyl sulphone (4,4'-isomer) is presented as a continuous line in FIG. 3; the yield of 2,4'- and 3,4'-isomers is presented as the continuous line in FIG. 4. The dashed lines in FIGS. 2 to 4 show by way of comparison the variation of respective yields with temperature at atmospheric pressure. The variation of yield (ordinate) of di-4-chlorophenyl sulphone with reaction time in hours (abscissa) at 220°C at a pressure of 70 kN/m² is shown in FIG. 5.

EXAMPLE 5

A number of experiments were carried out in the manner of Example 2 except that a 22.5 litre glass-lined mild steel reaction vessel was used. The reaction was carried out at 235°C for 10 hours at an excess pressure of 210 kN/m² (about 30 p.s.i.). The initial charge ratio of chlorobenzene to sulphuric acid was varied. The results are presented in the table below.

| Chlorobenzene: H₂SO₄ | No. of Expts. | % Yield of di-chlorophenyl sulphones Ratio v/v | | | |
|---|---|---|---|---|---|
| | | Total | 4,4' | 2,4' | 3,4' |
| 1.4 : 1 | 1 | 65.9 | 55.4 | 0.5 | 10.0 |
| 1.6 : 1 | 10 | 69.6 | 58.5 | 1.6 | 9.5 |
| 2.0 : 1 | 19 | 74.0 | 63.8 | 3.4 | 6.8 |
| 2.5 : 1 | 2 | 76.1 | 68.3 | 3.0 | 4.8 |
| 3.0 : 1 | 1 | 80.0 | 71.0 | 3.7 | 5.3 | throughout the reaction in order to keep the mixture boiling at the required temperature. The reaction time was 12 hours and pressure initially 270 kN/m² (40 p.s.i.).

The charge ratio (initial volume chlorobenzene: initial volume concentrated sulphuric acid) and reaction temperature were varied and the yields of di-chlorophenyl sulphones are presented below.

| Charge ratio | 2 : 1 | | 2.5 : 1 | | 3 : 1 | |
|---|---|---|---|---|---|---|
| Reaction Temperature (°C) | 235 | 245 | 235 | 245 | 235 | 245 |
| % by weight of di-chlorophenyl sulphones in reaction mixture (after removal of chlorobenzene) | 70.2 | 74.3 | 70.4 | 74.4 | 67.9 | 72.4 |
| 4,4'-isomer in reaction mixture (%) | 57.6 | 59.5 | 59.5 | 60.6 | 57.9 | 60.7 |
| 2,4'-isomer in reaction mixture (%) | 5.2 | 5.3 | 5.1 | 5.6 | 4.6 | 5.0 |
| 3,4'-isomer in reaction mixture (%) | 7.4 | 9.5 | 5.8 | 7.8 | 5.4 | 6.7 |

Figure 6:
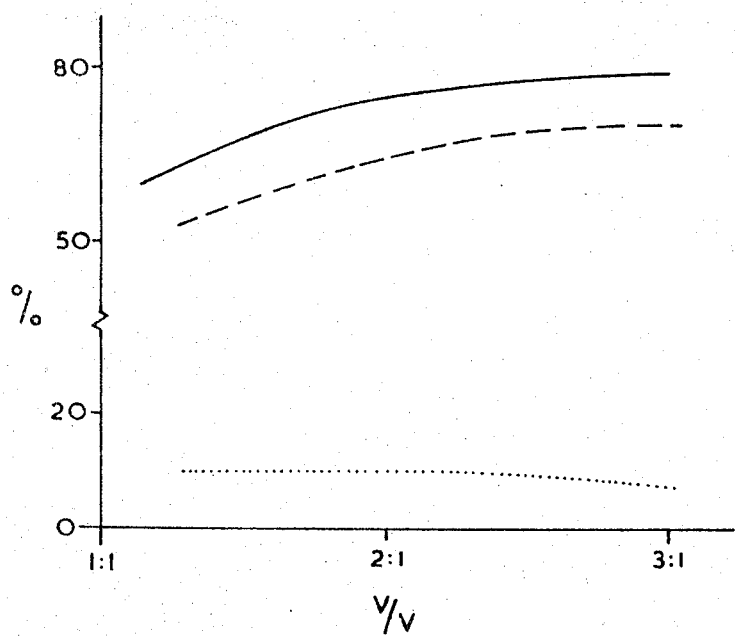

The variation of yield (ordinate) with charge ratio (abscissa) in such experiments is shown in FIG. 6 where the continuous line represents the total yield, the dashed line represents the yield of the 4,4'-isomer and the dotted line the combined yield of the 2,4'- and 3,4'-isomers.

EXAMPLE 6

A number of experiments were carried out in the manner of Example 5 except that the initial charge ratio of chlorobenzene to sulphuric acid was 1.6 : 1 in each experiment. The pressure above atmosphere at which the experiments were carried out was varied, and the results are presented in the following table.

| Pressure kN/m² | No. of Expts. | % Yield of di-chlorophenyl sulphones | | | |
|---|---|---|---|---|---|
| | | Total | 4,4' | 2,4' | 3,4' |
| 0 | 2 | 64.3 | 52.6 | 1.2 | 10.5 |
| 35 | 2 | 69.4 | 58.9 | 2.6 | 7.9 |
| 70 | 2 | 69.3 | 58.1 | 2.3 | 8.9 |
| 105 | 2 | 70.1 | 62.2 | 0.9 | 7.0 |
| 140 | 2 | 68.3 | 60.5 | 1.8 | 6.0 |
| 175 | 2 | 67.3 | 58.4 | 2.4 | 6.7 |

Figure 7:
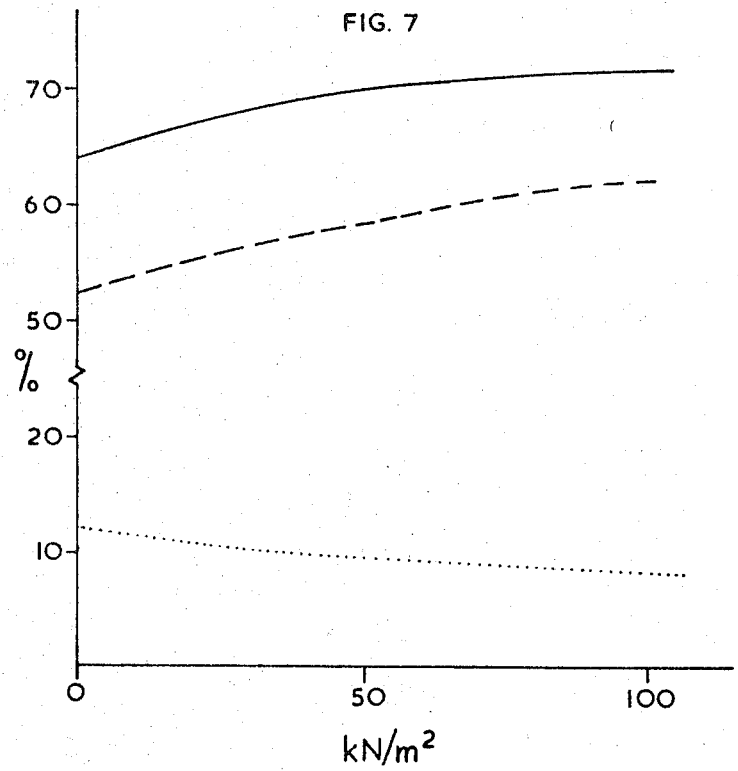

The variation of yield (ordinate) with pressure (abscissa) in such experiments is shown in FIG. 7 in which the continuous line represents the total yield, the dashed line the 4,4'-isomer yield and the dotted line the combined yield of 2,4'- and 3,4'-isomers.

EXAMPLE 7

Mixtures (2 dm³) of chlorobenzene and concentrated sulphuric acid (specific gravity 1.84) as described hereinafter were charged into a stainless steel reaction vessel of capacity 4 dm³ described in Example 1. Chlorobenzene and water distilled off the top of the fractionating column where the water was separated in the Dean & Starke assembly and the chlorobenzene returned to the flask through the fractionating column. Further quantities of chlorobenzene were added In general, the data presented in FIGS. 2 to 4 indicate that the total yield of di-chlorophenyl sulphones increases as the temperature of the reaction increases but the proportion of the undesirable 2,4'- and 3,4'-isomers also increases.

The data presented in FIGS. 2 to 4 also indicate how the yield of di-4-chlorophenyl sulphone is improved by increased pressure above atmospheric in the reaction vessel. Some improvement is obtained at pressures as little as 30 kN/m² (about 5 p.s.i.) above atmospheric, as shown in FIG. 7.

The dependence on the reaction time of the yield of di-4-chlorophenyl sulphone at a reaction temperature of 220°C and a pressure of 70 kN/m² (about 10 p.s.i.) above atmospheric is shown in FIG. 5, from which it can be seen that about 10 hours is a useful reaction time under these conditions although a small improvement in yield can be gained by longer reaction. With lower temperatures a longer time would be required, and at higher temperatures a shorter time, but in general a reaction time of 5 to 20 hours is convenient.

The effect of initial charge ratio of chlorobenzene to sulphuric acid on the total yield of di-chlorophenyl sulphones, the yield of di-4-chlorophenyl sulphone and the yields of other isomers is shown in FIG. 6. As the charge ratio increases from 1:1 to 3:1, the total yield of sulphones and the yield of the desired 4,4'-isomer increase whilst the yields of other isomers decrease. Increasing the ratio above 3:1 may be associated with a further improvement and a range of ratio between 2:1 and 4:1 is convenient.

The above-described method of adding further quantities of chlorobenzene or an inert azeotrope former to a boiling reaction mixture controls the reaction well and maintains reaction temperature and pressure essentially constant, but it can lead to problems in subsequent separation of the di-4-chlorophenyl sulphone product from excess chlorobenzene in the reaction mixture. Controlling the reaction temperature and maintaining boiling conditions by reducing pressure either manually or automatically results in a smaller excess of chlorobenzene at the end of the reaction and also does not require such a large reaction vessel for a given output of di-4-chlorophenyl sulphone. It is therefore preferred as a means of keeping the reaction mixture boiling at a desired temperature.

The conditions and findings associated with control of the reaction by lowering pressure as the reaction proceeds broadly parallel those described above for control by chlorobenzene addition. However, the reaction is initially carried out at higher pressures which may be as high as 1000 kN/m² (about 145 p.s.i.) in order to maintain boiling conditions because chlorobenzene has a boiling point of 245°C at 900 kN/m² (about 130 p.s.i.). The pressure is then gradually reduced as the proportion of chlorobenzene in the reaction mixture diminishes, being replaced by less volatile reaction products, so as to keep the reaction mixture boiling at the desired temperature.

We have found that the conditions for optimising the yield of di-4-chlorophenyl sulphone preferably comprise a charge ratio (chlorobenzene:sulphuric acid or sulphur trioxide) of between 2.5 : 1 and 3.5 : 1; a temperature lying between 220°C and 260°C preferably between 235°C and 255°C and most preferably between 242°C and 248°C, a reaction time of 14 to 18 hours and an initial superatmospheric pressure of 400 to 900 kN/m² (about 60 to about 130 p.s.i.).

Embodiments of the invention wherein the reaction temperature is maintained essentially constant by variation of pressure are illustrated by Examples 1 and 8 and accompanying FIG. 1.

EXAMPLE 8

A further experiment was carried out as described in Example 1 except that the temperature was varied as shown in the following table; reaction time was 16 hours.

| Reaction Temperature (°C) | % Yield of dichlorodiphenyl sulphones | | | |
|---|---|---|---|---|
| | Total | 4,4'- | 2,4'- | 3,4'- |
| 235 | 71.8 | 61.0 | 4.8 | 6.0 |
| 245 | 75.0 | 61.7 | 4.9 | 8.4 |
| 255 | 79.2 | 63.5 | 5.1 | 10.6 |

The results show that total yield of di-chlorophenyl sulphones and di-4-chlorophenylsulphone increases but the yield of undesired isomers in the reaction mixture also increases with increasing reaction temperature.

As shown in Example 1, the total sulphone yield increases with reaction time. It has also been found that the proportion of di-4-chlorophenyl sulphone in the reaction mixture decreases by about 1% between 12 and 16 hours at 245°C, although because the total yield of sulphone increases with time, the actual amount of di-4-chlorophenyl sulphone also increases.

I claim:

1. A process for the preparation of di-4-chlorophenyl sulphone in which (1) a reaction mixture containing 4-chlorobenzenesulphonic acid, itself formed by the reaction of chlorobenzene with sulphur trioxide in sulphuric acid, and chlorobenzene is kept at a temperature lying between 220°C and 260°C at a superatomspheric pressure lying between 30 and 1100 kN/M², (2) the reaction mixture is (A) sparged with an inert gas or (B) kept boiling at a temperature lying between 220°C and 260°C at a superatmospheric pressure lying between 30 and 1100 kN/m² by (i) progressively reducing the pressure as the reaction proceeds or (ii) adding further quantities of chlorobenzene to the reaction mixture as the reaction proceeds so that water is removed as vapour continuously as it is formed, and (3) the water vapour and accompanying chlorobenzene vapour are condensed and separated and the chlorobenzene is returned to the reaction mixture.

2. A process according to claim 1 in which the reaction mixture is kept at a temperature lying between 235°C and 255°C.

3. A process according to claim 2 in which the reaction mixture is kept at a temperature lying between 242°C and 248°C.

4. A process according to claim 1 in which the 4-chlorobenzenesulphonic acid is formed in situ from chlorobenzene and a sulphonating agent.

5. A process according to claim 4 in which the sulphonating agent is concentrated sulphuric acid.

6. A process according to claim 5 in which the ratio of chlorobenzene to concentrated sulphuric acid in the initial reaction mixture is between 4:1 and 1:1 by volume.

7. A process according to claim 1 in which the reaction mixture is sparged with an inert gas.

8. A process according to claim 1 in which the reaction mixture is kept boiling at a temperature lying between 220°C and 260°C at a superatmospheric pressure lying between 30 and 1100 kN/m².

9. A process according to claim 8 in which the reaction mixture is kept boiling by progressively reducing the pressure as the reaction proceeds.

10. A process according to claim 8 in which the reaction mixture is kept boiling at an essentially constant pressure by adding further quantities of chlorobenzene to the reaction mixture as the reaction proceeds.

11. A process according to claim 1 in which the reaction time is 5 to 20 hours.

12. A process according to claim 1 which includes the further step of recovering the di-4-chlorophenyl sulphone from the reaction mixture.

13. A process for the preparation of di-4-chlorophenyl sulphone from 4-chlorobenzene sulphonic acid, itself formed by the reaction of chlorobenzene with sulphur trioxide or sulphuric acid, by a method in which further quantities of chlorobenzene are added to the reaction mixture at such a rate as to maintain the refluxing reactant mixture at a temperature of between 190°C and 265°C and at a superatmospheric pressure of between 30 and 700 kN/m² whilst the water formed during the reaction is removed from the reaction mixture.

14. A process according to claim 13 in which sulphuric acid is used to form the 4-chlorobenzenesulphonic acid and the ratio of sulphuric acid to chlorobenzene in the initial charge is between 1:1 and 1:4 by volume.

15. A process according to claim 13 in which the reaction time is from 5 to 20 hours.

* * * * *